United States Patent [19]

Matsuto et al.

[11] Patent Number: 5,249,848
[45] Date of Patent: Oct. 5, 1993

[54] METHOD OF AND SYSTEM FOR CONTROLLING BRAKES

[75] Inventors: Takushi Matsuto; Atsuo Ota; Osamu Suzuki, all of Wako, Japan

[73] Assignee: Honda Giken Kogyo Kabushiki Kaisha, Tokyo, Japan

[21] Appl. No.: 945,382

[22] Filed: Sep. 16, 1992

[30] Foreign Application Priority Data

Sep. 17, 1991 [JP] Japan ................... 3-236537
Sep. 20, 1991 [JP] Japan ................... 3-241980

[51] Int. Cl.$^5$ .............................................. B60T 8/32
[52] U.S. Cl. ........................ 303/100; 188/162; 303/113.4; 303/115.2; 303/103; 303/105
[58] Field of Search .................. 303/115.2, 115.1, 100, 303/102, 103, 104, 105, 106, 108, 109, 110, 112, 113.4, 113.2; 188/344, 162, 181 T, 181 A, 181 R; 364/426.02, 426.03, 426.01

[56] References Cited

U.S. PATENT DOCUMENTS

| 4,717,211 | 1/1988 | Dittner ................... 303/115.2 |
| 4,997,237 | 3/1991 | Ricker et al. ............. 303/115.2 |
| 5,184,877 | 2/1993 | Miyakawa ............... 303/115.2 X |

Primary Examiner—Douglas C. Butler

[57] ABSTRACT

Disclosed is a method of and a system for controlling antilocking brakes employed in a vehicle such as a motorcycle. The position of an expander piston which constitutes an antilocking modulator is detected and the torque of a rotative drive source for actuating the expander piston is detected. A braking force used for each of the brakes is then computed from the detected position of the expander piston and the detected torque of the rotative drive source at the detected position. Further, friction coefficients of a road surface are estimated from the braking force thus computed and a target slip ratio is estimated from the estimated friction coefficients so as to carry out the optimum braking. Accordingly, the optimum target slip ratio can be estimated depending on high and low $\mu$ roads, thereby making it possible to provide satisfactory braking.

12 Claims, 13 Drawing Sheets

METHOD OF AND SYSTEM FOR CONTROLLING BRAKES

BACKGROUND OF THE INVENTION

1. Field of the Invention

The present invention relates to a method of and a system for controlling antilocking brakes employed in a vehicle, a motorcycle, etc.

2. Description of the Related Art

A system for controlling antilocking brakes has been employed in a vehicle, a motorcycle, etc., for example.

As a type of brake control system, there is known one in which a slip ratio of each wheel with respect to a road surface is computed based on the speed or velocity (Vc) of a running vehicle and the speed or velocity (Vw) of each wheel and the optimum braking is applied to the vehicle based on the computed slip ratio. Here, the slip ratio represents a value calculated from Vc−Vw/Vc.

The relationship between the slip ratio of each wheel with respect to the road surface and a friction coefficient ($\mu$) relative to the direction of rotation of each wheel is normally represented as shown in FIG. 1. The slip ratio vs. friction coefficient characteristic varies depending on the state of the road surface due to rain, snow or sand or the like. However, the $\mu$ value shows the peak in the slip ratio range of 10% to 20%. Therefore, the braking control can be carried out by causing the slip ratio to converge to a range in the vicinity of the slip ratio range of 10% to 20%.

The relationship between a friction coefficient ($\mu$) in the lateral or transverse direction (normal to the direction of the rotation) of each wheel and the slip ratio is then represented as shown in FIG. 2. In case of a road surface (hereinafter called a "low $\mu$ road") of a low friction coefficient, such as a frozen snow surface, the value of $\mu$ of the transverse direction of each wheel is reduced as compared with a road surface (hereinafter called a "high $\mu$ road") of a high friction coefficient, such as an asphalt road surface. It is therefore preferable to ensure the stability of the vehicle by setting a target slip ratio to a low value in the low $\mu$ road.

On the other hand, both a lock speed and a return or reset speed of each wheel with respect to the caliper pressure also vary greatly depending on $\mu$ of the road surface. In case of the high $\mu$ road, the lock speed is slow and the reset speed is fast. In case of the low $\mu$ road to the contrary, the reset speed is slow and the lock speed is fast (see FIG. 3). Thus, when the braking control is made at the same operation speed in varying the caliper pressure (hereinafter called a "pressure increasing and reducing rate") in spite of the fact that a difference is developed between the lock speed and the reset speed of each wheel with respect to the road surface owing to a variation in $\mu$, the optimum braking control cannot be attained for either a high $\mu$ road or a low $\mu$ road.

It is therefore considered that the braking control is carried out by estimating $\mu$ from an actual vehicle deceleration and a wheel velocity or the like. However, the value of $\mu$ tends to vary greatly due to a variation in the state of braking of a front wheel and/or a rear wheel, for example. It is thus considered that the caliper pressure is directly measured to more accurately estimate $\mu$. However, an expensive and heavy hydraulic-pressure sensor is required, which will cause problems from the standpoint of the manufacturing cost and the weight. Therefore, this type of hydraulic-pressure sensor has not been conventionally used.

SUMMARY OF THE INVENTION

With the foregoing problems in view, it is a general object of the present invention to provide a method of and a system for controlling brakes wherein $\mu$ can be easily and accurately estimated or computed, thereby making it possible to provide the optimum brake control.

It is a principal object of the present invention to provide a method of controlling brakes, comprising steps of detecting the position of an expander piston constituting an antilocking modulator, detecting the torque of a rotative drive source for driving the expander piston, computing a braking force for each of the brakes from the detected position of the expander piston and the detected torque of the rotative drive source at the detected position, estimating friction coefficients of a road surface from the computed braking force, and carrying out the optimum braking by estimating a target slip ratio from the estimated friction coefficients.

It is another object of the present invention to provide a method of controlling the brakes wherein a crank angle of a crank pin held in engagement with the expander piston is detected as the step of detecting the position of the expander piston, a terminal current value of a d.c. motor is detected as the step of detecting the torque of the d.c. motor serving as the rotative drive source, and caliper pressure is computed as a driving force for each of the brakes from the crank angle and the terminal current value to thereby perform the optimum braking.

It is a further object of the present invention to provide a method of controlling brakes, comprising steps of detecting the position of an expander piston constituting an antilocking modulator, detecting the torque of a rotative drive source for driving the expander piston, computing a braking force for each of the brakes from the detected position of the expander piston and the detected torque of the rotative drive source at the detected position, estimating friction coefficients of a road surface from the computed braking force, and carrying out the optimum braking by estimating a pressure increasing and reducing rate from the estimated friction coefficients.

It is a still further object of the present invention to provide a method of controlling brakes, comprising steps of detecting the position of an expander piston constituting an antilocking modulator, detecting the torque of a rotative drive source for driving the expander piston, computing a braking force for each of the brakes from the detected position of the expander piston and the detected torque of the rotative drive source at the detected position, estimating friction coefficients of a road surface from the computed braking force, and carrying out the optimum braking by estimating a target slip ratio and a pressure increasing and reducing rate from the estimated friction coefficients.

It is a still further object of the present invention to provide a method of controlling brakes, comprising steps of determining a braking force for each of the brakes at the time that a wheel acceleration/deceleration has reached about zero, computing a friction coefficients of a road surface from the determined braking force, averaging the present friction coefficient, the previous friction coefficient and friction coefficients prior to the previous friction coefficient when a slip ratio determined at the time that the wheel acceleration/deceleration is substantially zero is converging to the previously-determined slip ratio, and stopping a process for averaging the present friction coefficient, the previous friction coefficient and the friction coefficients so as to start a process for averaging new friction coefficients including the present friction coefficient when the slip ratio determined at the time that the acceleration/deceleration is substantially zero is diverging from the previously-determined slip ratio.

It is a still further object of the present invention to provide a method of controlling the brakes wherein the step of computing the friction coefficients is executed for every wheel and the step of weighting and averaging the computed friction coefficients is executed in accordance with the number of computations of the friction coefficients for every wheel.

It is a still further object of the present invention to provide a method of controlling the brakes wherein the step of computing the friction coefficients is executed for every wheel of a four-wheel vehicle, the step of weighting and averaging the friction coefficients is executed for the right front and rear wheels and left front and rear wheels, and the friction coefficients of the right front and rear wheels and the friction coefficients of the left front and rear wheels are weighted and averaged when the differences between the former respective friction coefficients and the latter respective friction coefficients fall within a predetermined range.

It is a still further object of the present invention to provide a system for controlling brakes, comprising means for detecting the position of an expander piston constituting an antilocking modulator, means for detecting the torque of a rotative drive source for driving the expander piston, means for computing a braking force for each of the brakes from the detected position of the expander piston and the detected torque of the rotative drive source at the detected position, and means for estimating friction coefficients of a road surface from the computed braking force and estimating a target slip ratio from the estimated friction coefficients.

It is a still further object of the present invention to provide a system for controlling brakes, comprising means for detecting the position of an expander piston constituting an antilocking modulator, means for detecting the torque of a rotative drive source for driving the expander piston, means for computing a braking force for each of the brakes from the detected position of the expander piston and the detected torque of the rotative drive source at the detected position, and means for estimating friction coefficients of a road surface from the computed braking force and estimating a pressure increasing and reducing rate from the estimated friction coefficients.

It is a still further object of the present invention to provide a system for controlling brakes, comprising means for detecting the position of an expander piston constituting an antilocking modulator, means for detecting the torque of a rotative drive source for driving the expander piston, means for computing a braking force for each of the brakes from the detected position of the expander piston and the detected torque of the rotative drive source at the detected position, and means for estimating friction coefficients of a road surface from the computed braking force and estimating a target slip ratio and a pressure increasing and reducing rate from the estimated friction coefficients.

The above and other objects, features and advantages of the present invention will become apparent from the following description and the appended claims, taken in conjunction with the accompanying drawings in which preferred embodiments of the present invention are shown by way of illustrative example.

DETAILED DESCRIPTION OF THE PREFERRED EMBODIMENTS

Figure 5:
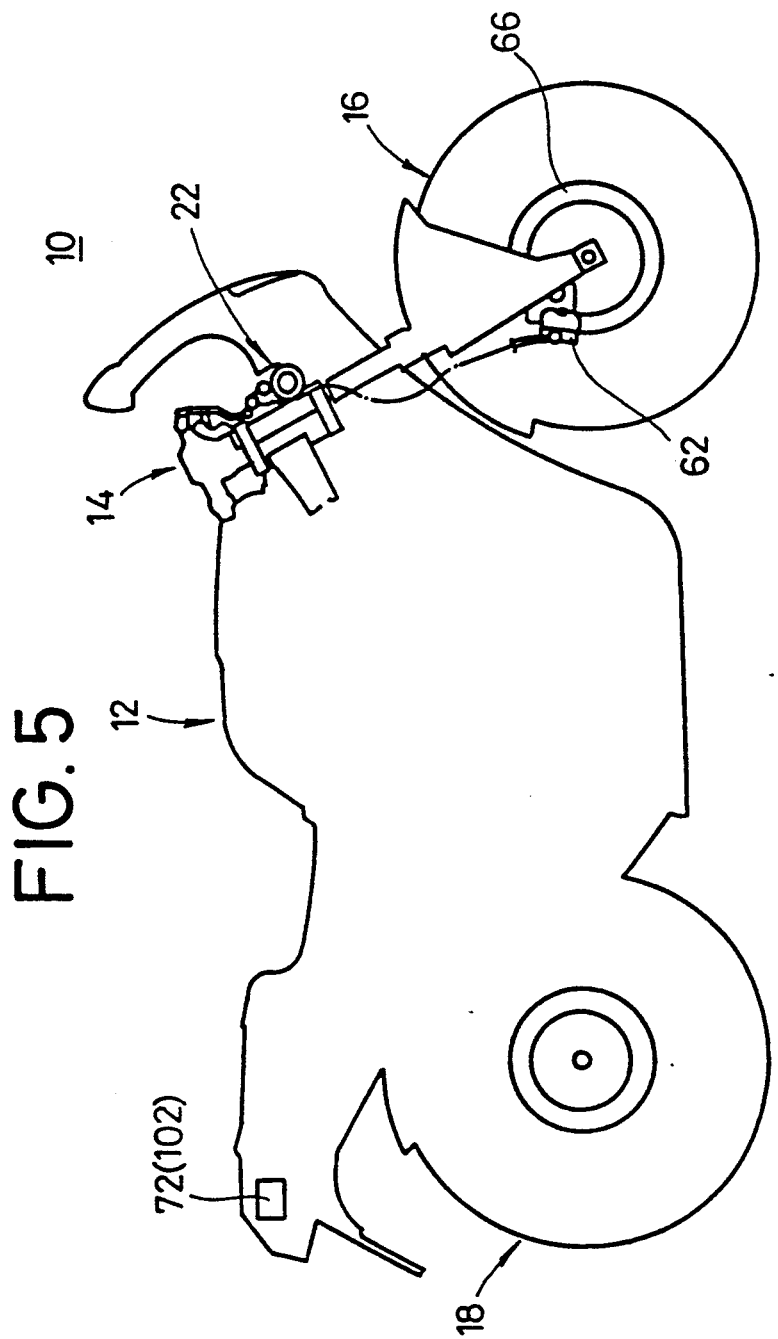
FIG. 5 is a schematic exterior view showing a motorcycle in which the brake control system shown in FIG. 4 is to be provided.

FIG. 5 is a schematic exterior view showing a motorcycle in which a system for controlling brakes according to a first embodiment of the present invention is incorporated. A motorcycle 10 comprises a main body 12, a handle 14, a front wheel 16 and a rear wheel 18.

Figure 1:
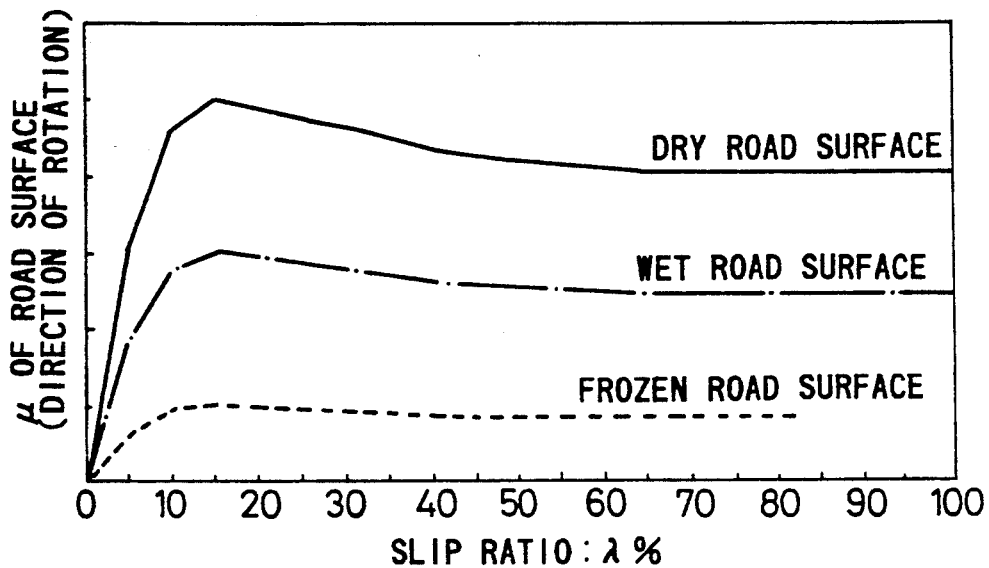
FIG. 1 is a graph for describing normal $\mu$-S curves corresponding to various states of a road surface.
Figure 2:
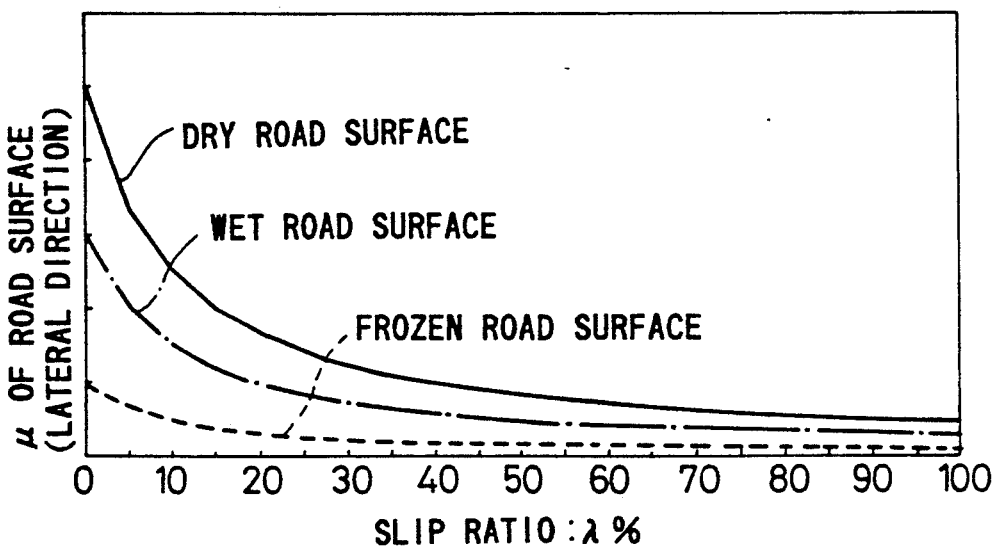
FIG. 2 is a graph for describing relationships between a wheel transverse friction coefficient ($\mu$) and a slip ratio.
Figure 3:
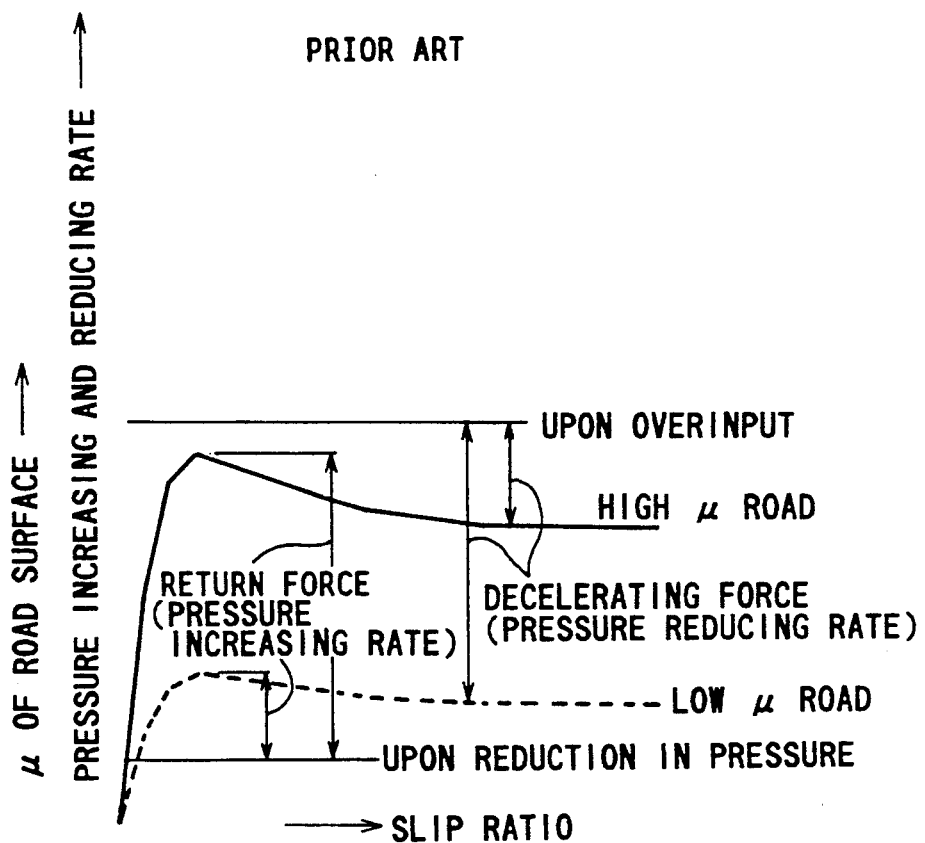
FIG. 3 is a graph for describing relationships between return forces and decelerating forces at high and low $\mu$ roads.
Figure 4:
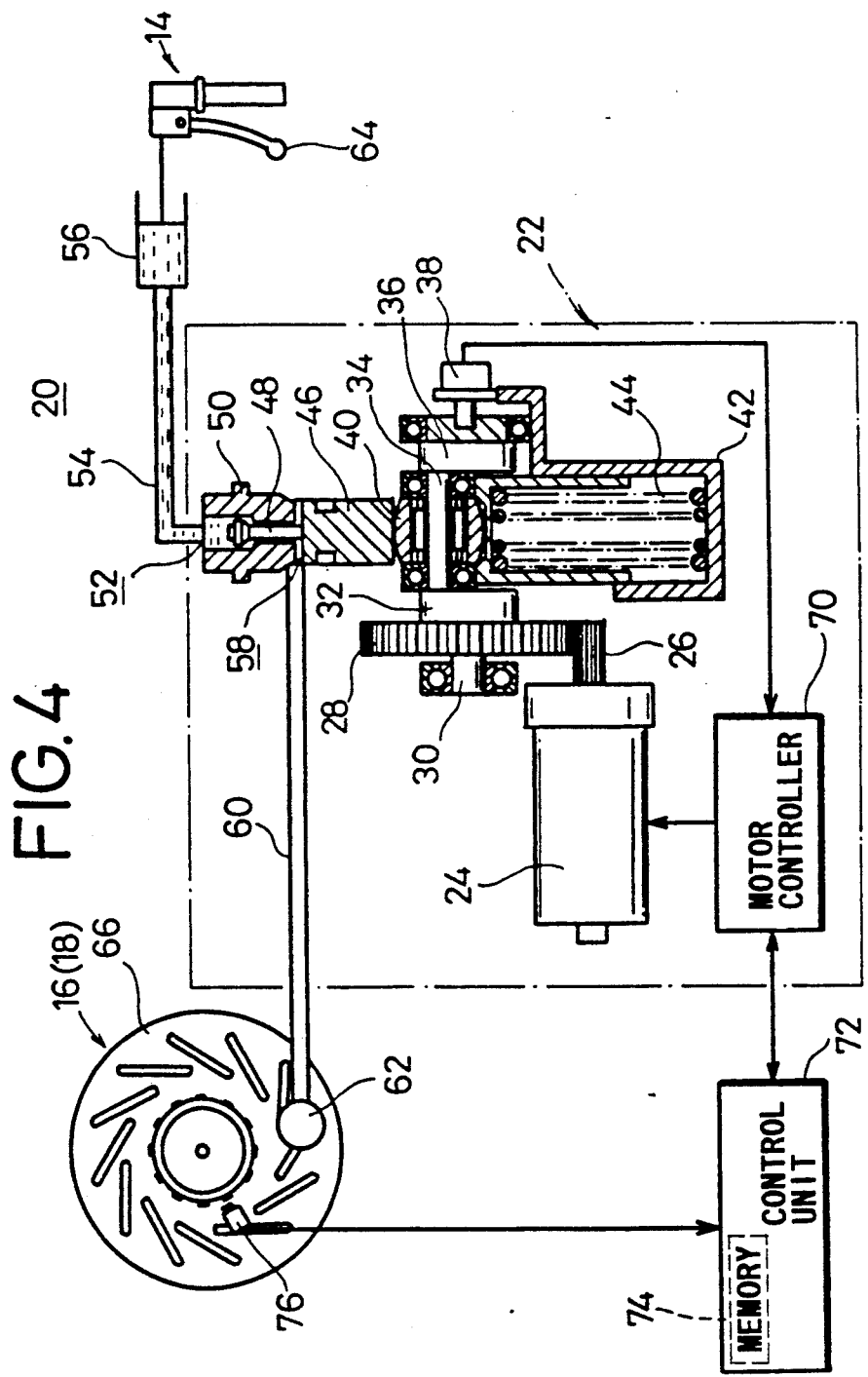
FIG. 4 is a view schematically showing the structure of a system for carrying out a brake control method according to a first embodiment of the present invention.

The brake control system 20 according to the first embodiment is disposed in the motorcycle 10. As shown in FIG. 4, the brake control system 20 has an antilocking modulator 22. A pinion 26 is rotatably mounted to a d.c. motor (rotative drive source) 24 of the modulator 22 and maintained in meshing engagement with a gear 28. The gear 28 is supported by a crank shaft 30 to which one end of a crank pin 34 is eccentrically coupled via a crank arm 32. A potentiometer 38 serving as a means for detecting the position of an expander piston (to be describe later) is attached to the other end of the crank pin 34 via another crank arm 36

A cam bearing 40 is rotatably mounted on the crank pin 34. The lower end of the cam bearing 40 is always pressed toward the upper limit position under the action of return springs 44 held in a spring holder 42. The expander piston 46 is brought into abutment against the upper end of the cam bearing 40 and displaced in upward and downward directions in response to an up-and-down movement of the cam bearing 40 so as to open and close a cutoff valve 48.

A cutoff valve holder 50 having the cutoff valve 48 incorporated therein is disposed in the upper part of the expander piston 46. A master cylinder 56 is coupled via a passage 54 to an input port 52 of the cut valve holder 50. On the other hand, a wheel braking caliper cylinder 62 is coupled via a passage 60 to an output port 58 of the cut valve holder 50. The master cylinder 56 and the caliper cylinder 62 are interconnected with each other via the passage 54, the modulator 22 and the passage 60. This path is filled with oil for the hydraulic pressure. The master cylinder 56 is actuated to adjust the hydraulic pressure under the action of a brake lever 64 so as to cause the cutoff valve 48 to actuate the caliper cylinder 62, thereby applying a braking force to a disk plate 66 disposed in the front wheel 16 and/or the rear wheel 18.

A motor controller 70 is electrically connected to the potentiometer 38 and the d.c. motor 24. The motor controller 70 is activated to supply information about the angular position of the crank pin 34, which has been detected by the potentiometer 38, i.e., information about the position of the expander piston 46 and a terminal current value of the d.c. motor 24 to a control unit 72.

The control unit 72 has a function for computing caliper pressure (braking forces for brakes) based on the motor torque obtained from the terminal current value of the d.c. motor 24 and the position of the expander piston 46. Further, the control unit 72 also has a memory 74 in which a first table (to be described later) for predicting or estimating a friction coefficient ($\mu$) of a road surface based on the initial pressure obtained from the computed caliper pressure and a second table (to be described later) for estimating a target slip ratio and/or a pressure increasing and reducing rate from the estimated friction coefficient ($\mu$) have been stored as data. A sensor 76 for detecting a wheel speed, which is attached to the disk plate 66, is electrically connected to the control unit 72.

The operation of the brake control system 20 constructed as described above will now be described below in connection with the brake control method according to the first embodiment of the present invention.

Upon normal braking, the crank pin 34 is maintained at a predetermined upper limit position by resilient forces of the return springs 44 to thereby cause the cam bearing 40 mounted on the crank pin 34 to hold the expander piston 46 in a forced-up state. Thus, the cutoff valve 48 is forced up by the expander piston 46 so as to cause the input port 52 to communicate with the output port 58.

When the brake lever 64 is gripped, the master cylinder 56 is actuated in such a manner that brake hydraulic pressure generated by the master cylinder 56 is transmitted to the caliper cylinder 62 through the passage 54, the input port 52, the output port 58 and the passage 60 in that order, thereby applying a braking force to the disk plate 66.

When the control unit 72 then supplies a drive signal to the motor controller 70 to control a desired brake, the motor controller 70 controls the direction and amount of rotation of the d.c. motor 24. Therefore, the pinion 26 mounted on an unillustrated rotatable shaft is rotated to turn both the gear 28 held in meshing engagement with the pinion 26 and the crank arm 32 fixedly mounted to the gear 28 via the crank shaft 30, thereby displacing the crank pin 34 mounted to the crank arm 32 from the upper limit position to the lower limit position. Thus, the cam bearing 40 is lowered under the displacement action of the crank pin 34, so that the brake hydraulic pressure which acts on the expander piston 46 is added to the torque of the d.c. motor 24. Therefore, the expander piston 46 is pressed against the cam bearing 40 so as to be promptly lowered.

When the expander piston 46 is lowered a predetermined amount, the cutoff valve 48 is seated to thereby block the communication between the input port 52 and the output port 58. Thus, when the expander piston 46 is further lowered singly, the volume on the output port 58 side increases so as to decrease the hydraulic pressure applied to the caliper cylinder 62, thereby reducing a braking force applied to the front wheel 16, for example.

Now, the position of the expander piston 46 is detected by the potentiometer 38 as a crank angle in accordance with the displacement of the crank pin 34. A value outputted from the potentiometer 38 is introduced into the motor controller 70 as data. Afterwards, the motor controller 70 supplies the output value of the potentiometer 38 and the terminal current value of the d.c. motor 24 to the control unit 72. In the control unit 72, the motor torque (TM) of the d.c. motor 24 is first computed based on the terminal current value and the caliper pressure (PC) is then computed in accordance with the following respective equations:

$$TM = KT \cdot (IM - IO) \qquad (1)$$

$$TP = (Z \cdot Z \cdot JM + JC) \cdot \omega - TM + TS \pm TF \qquad (2)$$

$$PC = 4 \cdot TP / (\pi \cdot D \cdot D \cdot e \cdot \sin\theta_c) \qquad (3)$$

where
TM: motor torque
IM: motor current
TP: caliper pressure torque
JM: motor inertial mass
$\omega$: crank angular acceleration
TF: friction torque
KT: motor torque constant
IO: motor non-load current
Z: reduction ratio
JC: crank inertial mass
TS: B/USPG torque
D: diameter of expander piston
e: eccentric amount of crank
$\theta_c$: crank angle After the caliper pressure (PC) has been estimated in this way, the initial pressure ($P_o$) is computed based on the caliper pressure (PC) and the crank angle at the time of its estimation. The initial pressure ($P_o$) represents the caliper pressure at the moment that the cut valve 48 has been seated.

Figure 6:
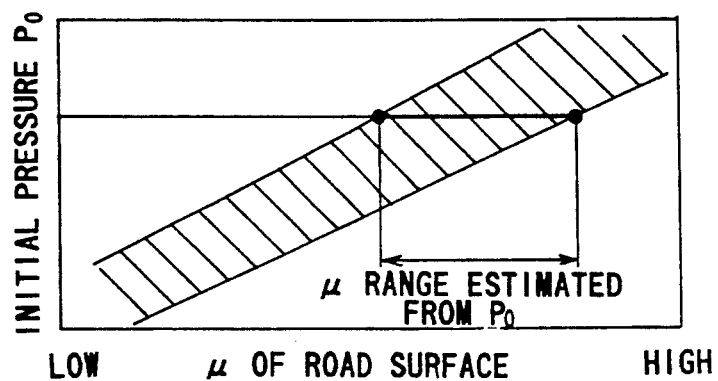
FIG. 6 is a graph for describing a relationship between initial pressure ($P_o$) and $\mu$ of a road surface.
Figure 7:
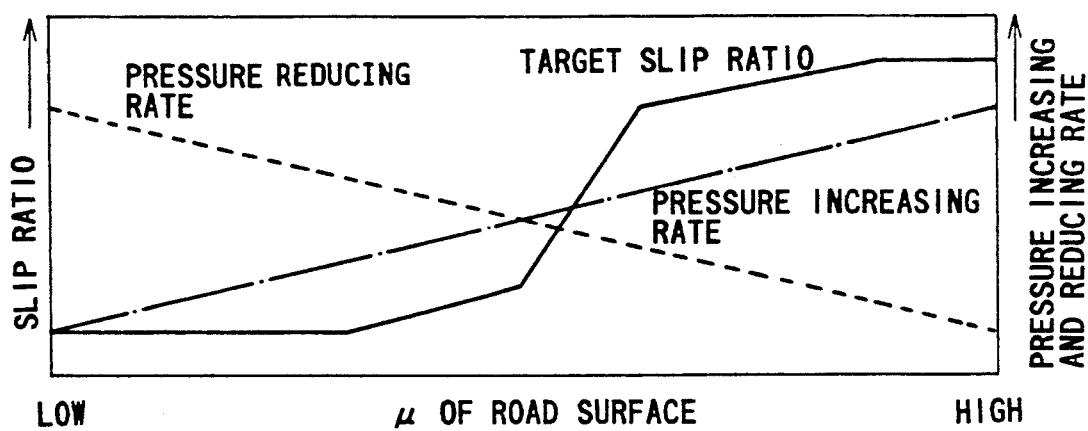
FIG. 7 is a graph for describing relationships between $\mu$ of a road surface, a target slip ratio and a pressure increasing and reducing rate.

Then, μ of the road surface, which corresponds to the computed initial pressure ($P_o$), is estimated based on the first table (see FIG. 6), which has been stored as data in the memory 74 of the control unit 72. Further, the target slip ratio and/or the pressure increasing and reducing rate, which corresponds to the estimated μ, is estimated based on the second table (see FIG. 7) stored as data in the memory 74. Thus, the control unit 72 outputs a signal for controlling a braking force to the motor controller 70 based on the target slip ratio and/or the pressure increasing and reducing rate in such a manner that the motor controller 70 controls the direction and amount of rotation of the d.c. motor 24, thereby placing the expander piston 46 in a desired position. Consequently, the braking force of the front wheel 16 and/or the rear wheel 18 is controlled.

In the first embodiment, the crank angle of the crank pin 34 is detected by the potentiometer 38. At the same time, the terminal current value of the d.c. motor 24 is also detected. Afterwards, the caliper pressure (PC) is computed from the detected crank angle and terminal current value. Further, the μ and the target slip ratio and/or the pressure increasing and reducing rate are estimated based on the first and second tables after the initial pressure ($P_o$) has been computed. Therefore, dedicated sensors such as a conventional expensive and heavy hydraulic sensor, etc. can be omitted, thereby making it possible to provide the brake control system 20 which is extremely economical and light in weight.

By selecting a target slip ratio in accordance with a low μ road and a high μ road in particular, the optimum target slip ratio can be estimated based on the estimated μ. That is, the target slip ratio can be set to a low value so as to secure the stability of the vehicle under the low μ road. On the other hand, the target slip ratio can be set to a high value so as to secure a satisfactory deceleration under the high μ road.

In addition, a μ-S curve itself can be computed based on the caliper pressure (PC) computed from the equations (1) through (3), a wheel acceleration/deceleration determined from the sensor 76 and the wheel slip ratio or the like. Thus, the μ can be more accurately estimated, thereby making it possible to estimate the target slip ratio with high accuracy.

Incidentally, the first embodiment has shown a case in which the caliper pressure of the caliper cylinder 62 for applying the braking force to the disk plate 66 is computed so as to estimate the μ and the target slip ratio. However, the present embodiment can be applied even to a case where a braking force is applied to a drum brake. At this time, a brake shoe attached to the drum brake under pressure is used as the caliper cylinder 62. The caliper pressure (PC) corresponding to the degree of opening of the brake shoe is computed based on a crank angle and a terminal current value, thereby estimating μ and a target slip ratio based on the computed caliper pressure (PC).

Further, the above-described embodiment has shown a case in which the front wheel 16 is controlled, as an illustrative example. However, the rear wheel 18 can also be controlled in the same manner as described above.

A method of controlling brakes according to a second embodiment of the present invention will now be described below in connection with a system for carrying out the brake control method. Incidentally, the same elements of structure as those employed in the brake control system 20 according to the first embodiment are identified by like reference numerals and their detailed description will therefore be omitted.

Figure 8:
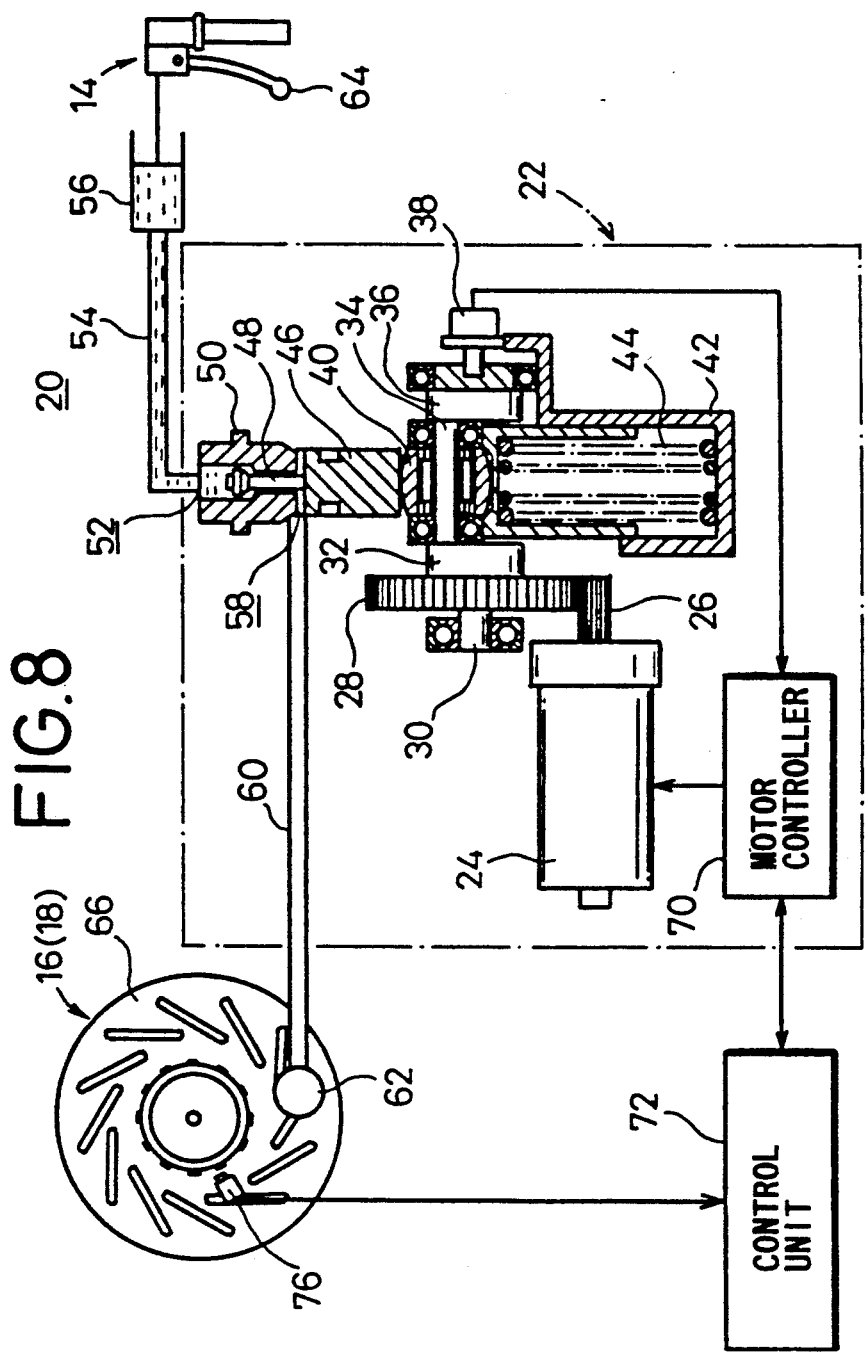
FIG. 8 is a view schematically illustrating the structure of a system for performing a brake control method according to a second embodiment of the present invention.

As shown in FIG. 8, the brake control system 100 according to the second embodiment is provided with a control unit 102, which has a function for computing caliper pressure (braking forces for brakes) based on the motor torque determined from a terminal current value of a d.c. motor 24 and the position of an expander piston 46 and a function for computing a friction coefficient (μ) of a road surface based on the computed caliper pressure.

The operation of the brake control system 100 constructed as described above will now be described below in connection with the brake control method according to the second embodiment.

Upon normal braking, a crank pin 34 is maintained at a predetermined upper limit position by resilient forces of return springs 44 to thereby cause a cam bearing 40 mounted on a crank pin 34 to hold the expander piston 46 in a forced-up state. Thus, a cut valve 48 is forced up by the expander piston 46 so as to cause an input port 52 to communicate with an output port 58.

When a brake lever 64 is now gripped, a master cylinder 56 is actuated in such a manner that brake hydraulic pressure generated by the master cylinder 56 is transmitted to a caliper cylinder 62 through a passage 54, the input port 52, the output port 58 and a passage 60 in that order, thereby applying a braking force to a disk plate 66.

When the control unit 102 then supplies a drive signal to a motor controller 70 so as to control a desired brake, the motor controller 70 controls the direction and amount of rotation of the d.c. motor 24. Therefore, a pinion 26 mounted on an unillustrated rotatable shaft is rotated to turn both a gear 28 held in meshing engagement with the pinion 26 and a crank arm 32 fixedly mounted to the gear 28 via a crank shaft 30, thereby displacing the crank pin 34 mounted to the crank arm 32 from the upper limit position to the lower limit position. Thus, the cam bearing 40 is lowered under the displacement action of the crank pin 34, so that the brake hydraulic pressure which acts on the expander piston 46 is added to the torque of the d.c. motor 24. Therefore, the expander piston 46 is pressed against the cam bearing 40 so as to be promptly lowered.

When the expander piston 46 is lowered a predetermined amount, the cutoff valve 48 is seated to thereby block the communication between the input port 52 and the output port 58. Thus, when the expander piston 46 is further lowered singly, the volume on the output port 58 side increases so as to decrease the hydraulic pressure applied to the caliper cylinder 62, thereby reducing a braking force applied to a front wheel 16, for example.

Figure 9:
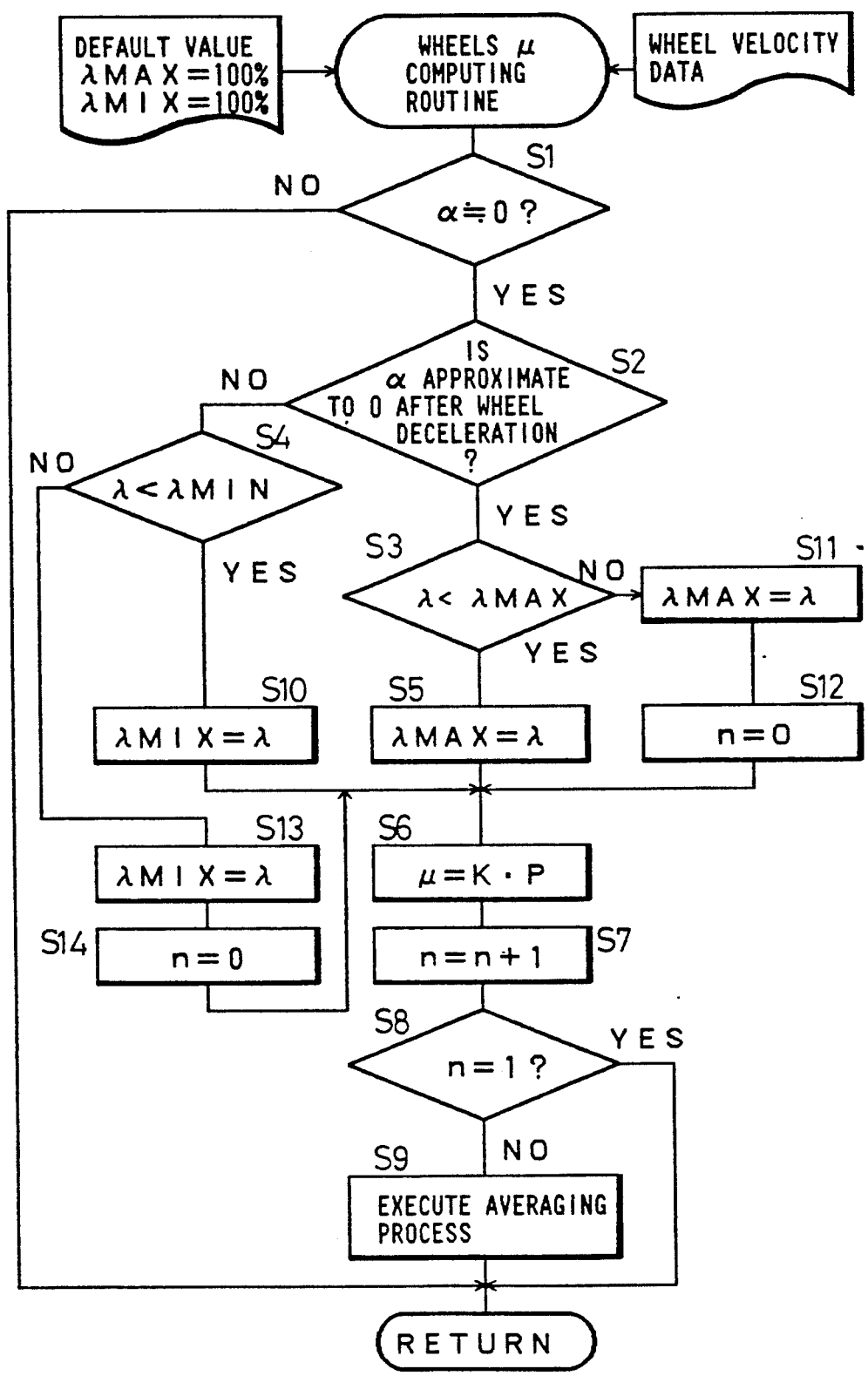
FIG. 9 is a flowchart for describing a $\mu$ computing routine executed in the brake control method shown in FIG. 8.
Figure 10:
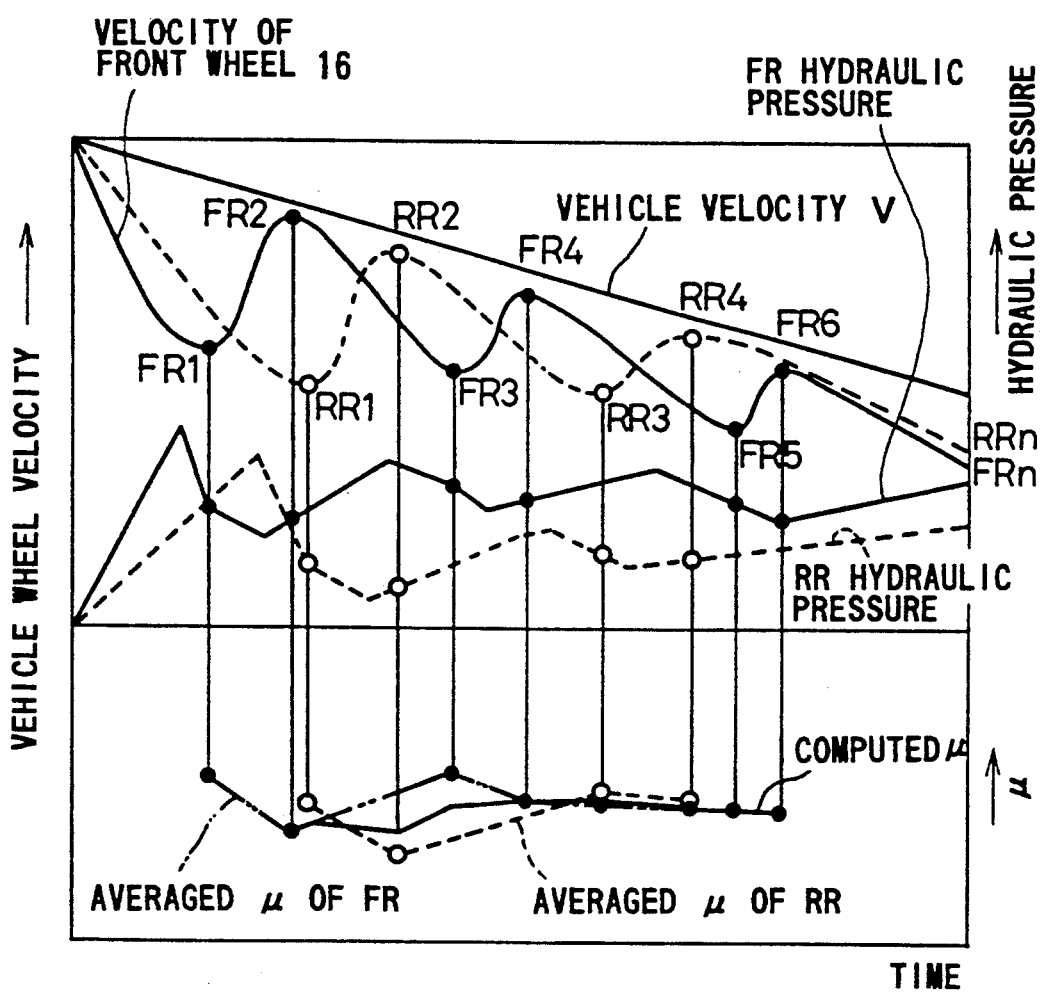
FIG. 10 is a graph for describing relationships between wheel speeds, hydraulic pressures and computed $\mu$.

Now, a process for computing a friction coefficient (μ) of a road surface is carried out in accordance with a flowchart shown in FIG. 9. A description will be first made of the front wheel 16. If it is detected by a sensor 76 attached to the disk plate 66 of the front wheel 16 that an acceleration/deceleration α of the front wheel 16 has reached about zero (Step S1), then a slip ratio (λ) is computed. It is then determined whether the front wheel 16 has been brought into an accelerated state or a decelerated state (Step S2). The routine procedure proceeds to Step S3 or S4 based on the result of determination. If the acceleration/deceleration (α) of the front wheel 16 has reached about zero from the decelerated state (see FR1 in FIG. 10), then the speed of the front wheel 16 is reduced as compared with a vehicle speed or velocity V, thereby increasing the slip ratio (λ). Then, the slip ratio (λ) is compared with the preset maximum slip ratio (λMAX). If λ<λMAX (i.e., if the answer is determined to be YES in Step S3), then λ is set to λMAX (Step S5).

Further, the friction coefficient (μ) of the road surface is computed. This μ is determined from the following equation:

$$\mu = (K \cdot P + I \cdot a)/WH \qquad (4)$$

where
K: brake resistive force per unit hydraulic pressure
P: brake hydraulic pressure (caliper pressure)
I: wheel inertial gravity
a: wheel acceleration/deceleration
WH: wheel sharing load In the second embodiment, when the acceleration/deceleration (α) of the front wheel 16 has reached about zero, i.e., when I·α=0, the friction coefficient (μ) is computed. Therefore, the above equation (4) can be represented as the following equation (5) in the form of a linear expression of P:

$$\mu = k \cdot P \qquad (5)$$

where
k: constant

Now, the brake hydraulic pressure P may be directly measured by a hydraulic-pressure gage. Alternatively, the brake hydraulic pressure P can be determined by computation as will be described later. That is, the position of the expander piston 46 is detected as a crank angle by a potentiometer 38 in accordance with the displacement of the crank pin 34. A value outputted from the potentiometer 38 is introduced into the motor controller 70 as data. Afterwards, the motor controller 70 supplies the output value of the potentiometer 38 and the terminal current value of the d.c. motor 24 to the control unit 102. In the control unit 102, the motor torque (TM) of the d.c. motor 24 is first computed based on the terminal current value and the brake hydraulic pressure P is then computed in accordance with the following equations:

$$TM = KT \cdot (IM - IO) \qquad (6)$$

$$TP = (Z \cdot Z \cdot JM + JC) \cdot \omega - TM + TS \pm TF \qquad (7)$$

$$P = 4 \cdot TP/(\pi \cdot D \cdot D \cdot e \cdot \sin\theta_c) \qquad (8)$$

where
TM: motor torque
IM: motor current
TP: caliper pressure torque
JM: motor inertial mass
ω: crank angular acceleration
TF: friction torque
e: eccentric amount of crank
KT: motor torque constant
IO: motor non-load current
Z: reduction ratio
JC: crank inertial mass
TS: B/USPG torque
D: diameter of expander piston
$\theta_c$: crank angle After the friction coefficient (μ) has been computed (Step S6), the routine procedure is returned to Step S1 via Steps S7 and S8 when the routine procedure for computing the friction coefficient is executed as the first time. If, on the other hand, this routine procedure is executed as the second time and after, then a process for averaging computed friction coefficients (μ) is carried out (Step S9).

If, on the other hand, it is determined in Step S2 that the acceleration/deceleration (α) of the front wheel 16 has reached about zero from the accelerated state (see NO in Step S2 and FR2 in FIG. 10), then the speed of the front wheel 16 comes as close as possible to the vehicle velocity V, thereby reducing the slip ratio (λ). Then, the slip ratio (λ) is compared with the preset minimum slip ratio (λMIN). If λ<λMIN (i.e., if the answer is determined to be YES in Step S4), then this λ is set to λMIN (Step S10). Further, after friction coefficients (μ) of a road surface have been computed, a process for averaging the computed friction coefficients (μ) is carried out to set n to be greater than 1 (i.e., n>1) (Steps S6 through S9).

Thus, slip ratios (λ) at the time that the acceleration/deceleration (α) of the front wheel 16 has reached about zero (see FR1 through FRn), are computed. Afterwards, the slip ratios (λ) thus determined are successively compared with the minimum slip ratio. If it is determined that the slip ratios (λ) thus determined has converged to the previously determined slip ratio (λ), then a process for averaging the friction coefficients (μ) at the respective points (FR1 through FRn) is carried out (see the computed μ in FIG. 10).

Figure 11:
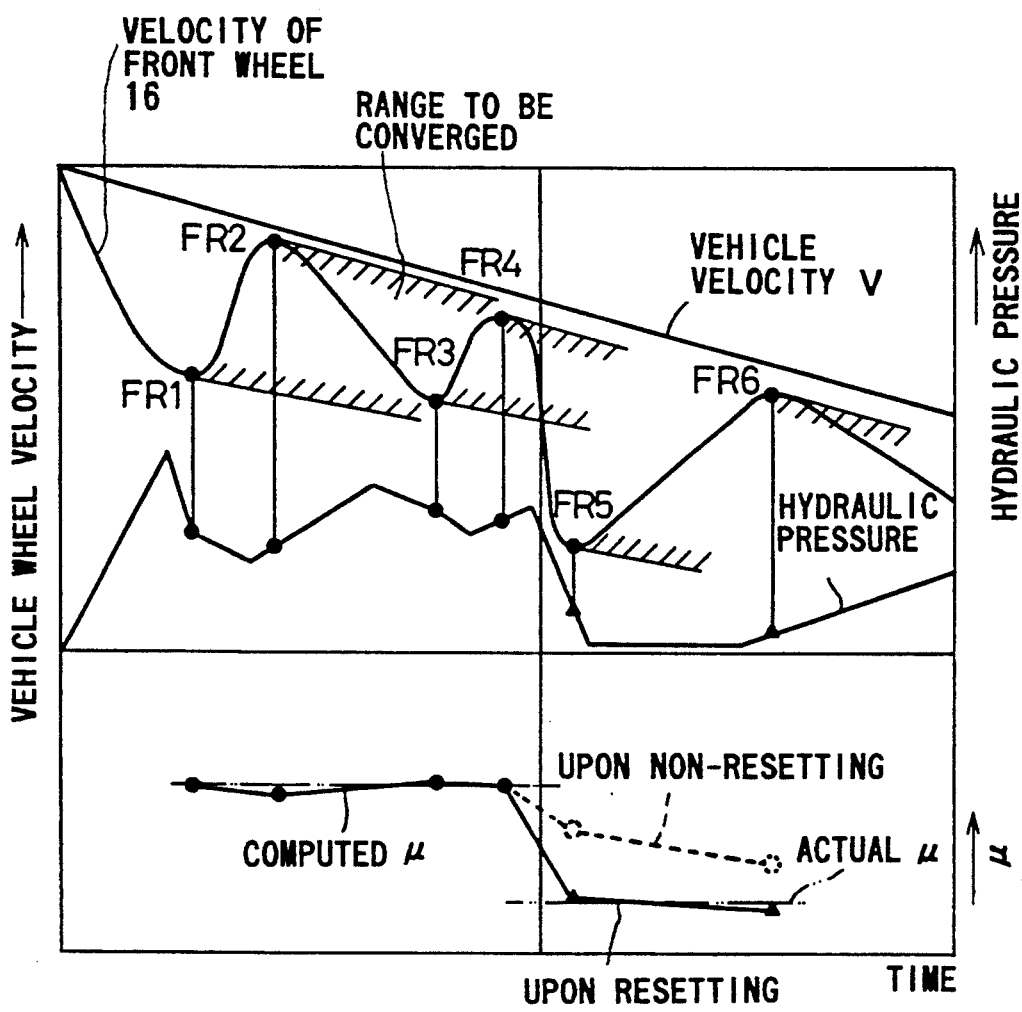
FIG. 11 is a graph for describing relationships between a wheel speed, hydraulic pressure and $\mu$ at the time the state of a road surface is changed.

When the state of the road surface is changed from a dry asphalt road (high μ road) to a frozen road (low μ road) as shown in FIG. 11, the slip ratio (λ) at the FR5 point becomes larger than that at the FR3 point. Therefore, the answer is determined to be NO in Step S3. Hence the slip ratio (λ) is set to λMAX and the μ averaging process is stopped so as to reset n to zero (i.e., n=0) (Steps S11 and S12). Then, a process for averaging friction coefficients (μ) is newly initiated from the FR5 point. Similarly, if it is determined in Step S4 that the present slip ratio (λ) is lower than the minimum slip ratio (λMIN) indicative of the previous slip ratio, then the slip ratio (λ) is set to λMIN and the μ averaging process is stopped so as to reset n to zero (i.e., n=0) (Steps S13 and S14).

The friction coefficients (μ) computed at the respective points (FRI through FRn) are averaged in the second embodiment. It is therefore possible to obtain values which are as close as possible to actual friction coefficients (μ). In addition, high accurate and most suitable brake control can be carried out by adjusting the caliper pressure of the front wheel 16 based on the computed μ. Further, if it is determined that the state of the road surface has been changed after the respective slip ratios (λ) have been successively compared with the reference slip ratio, then the averaging process of the friction coefficients (μ) is stopped so as to start a μ re-averaging process. Therefore, there is no longer developed a problem that the computed friction coefficient is different from the actual friction coefficient (μ) as in the case where the μ averaging process is carried out irrespective of a variation in the state of the road surface. It is thus possible to obtain a value approximate to the actual friction coefficient (μ) at all times.

Figure 12:
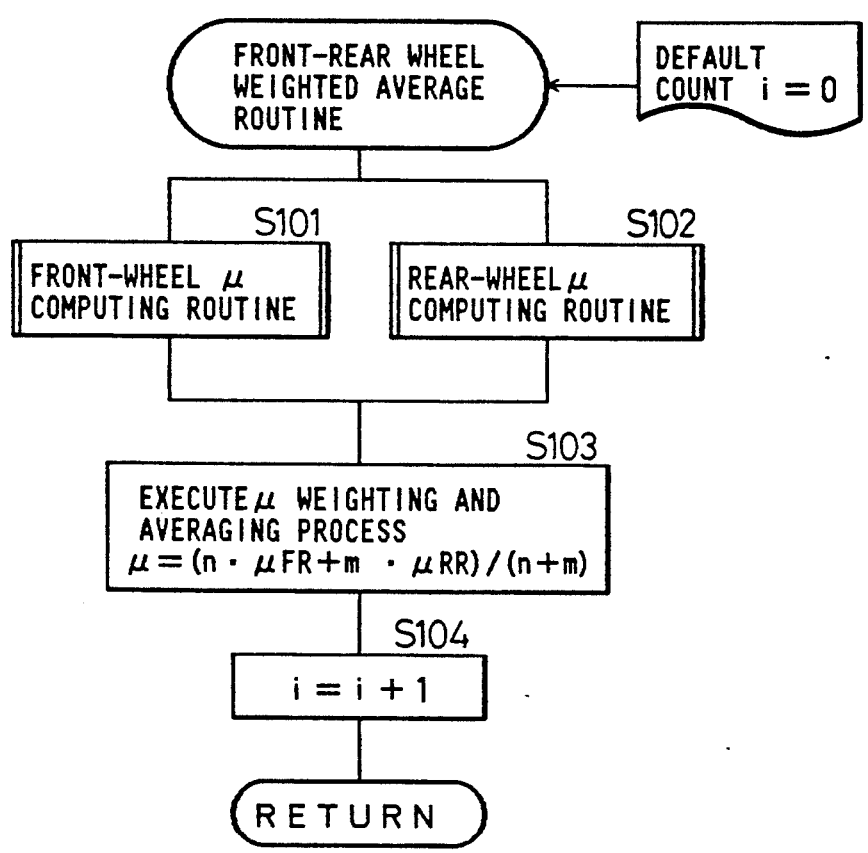
FIG. 12 is a flowchart for describing a front-rear wheel weighted average routine.

A description has been made of the front wheel 16 alone. However, the rear wheel 18 can also be treated in the same manner as described above. When the rear wheel 18 is used, friction coefficients (μ) at the respective points (RR1 through RRn in FIG. 10) are computed and respective slip ratios (λ) are averaged (Steps S101 and S102 in FIG. 12). Then, the averaged μ of the front wheel 16 and the averaged μ of the rear wheel 18 are weighted and averaged to thereby compute μ of the road surface (Steps S103 and S104).

Figure 13:
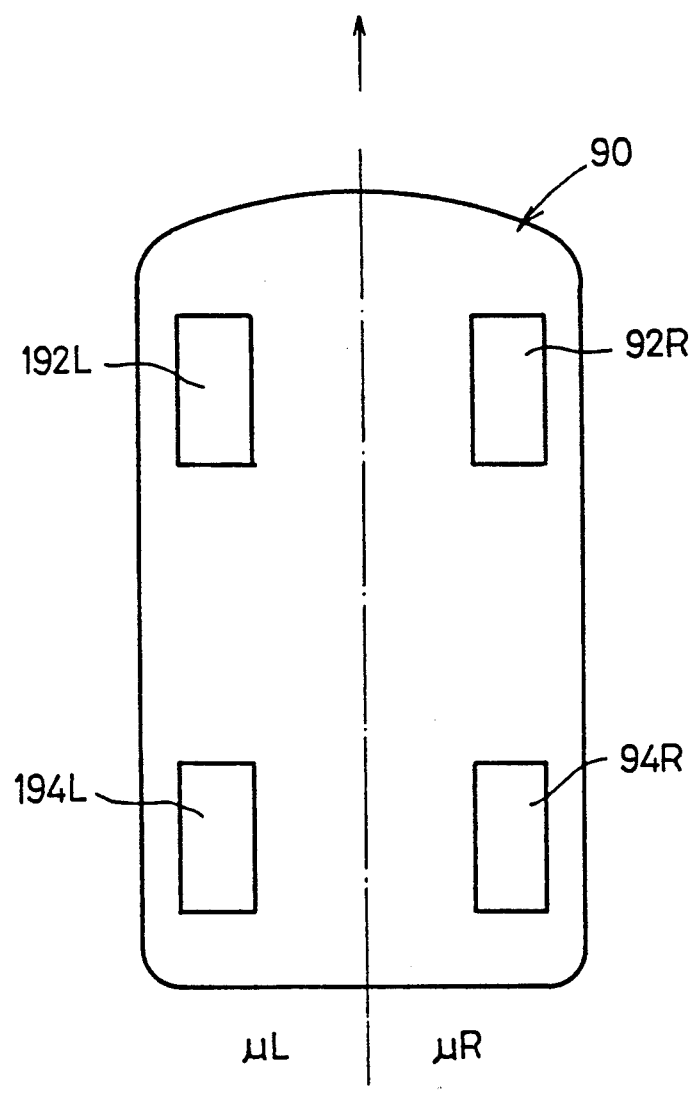
FIG. 13 is a schematic view showing a four-wheel vehicle.
Figure 14:
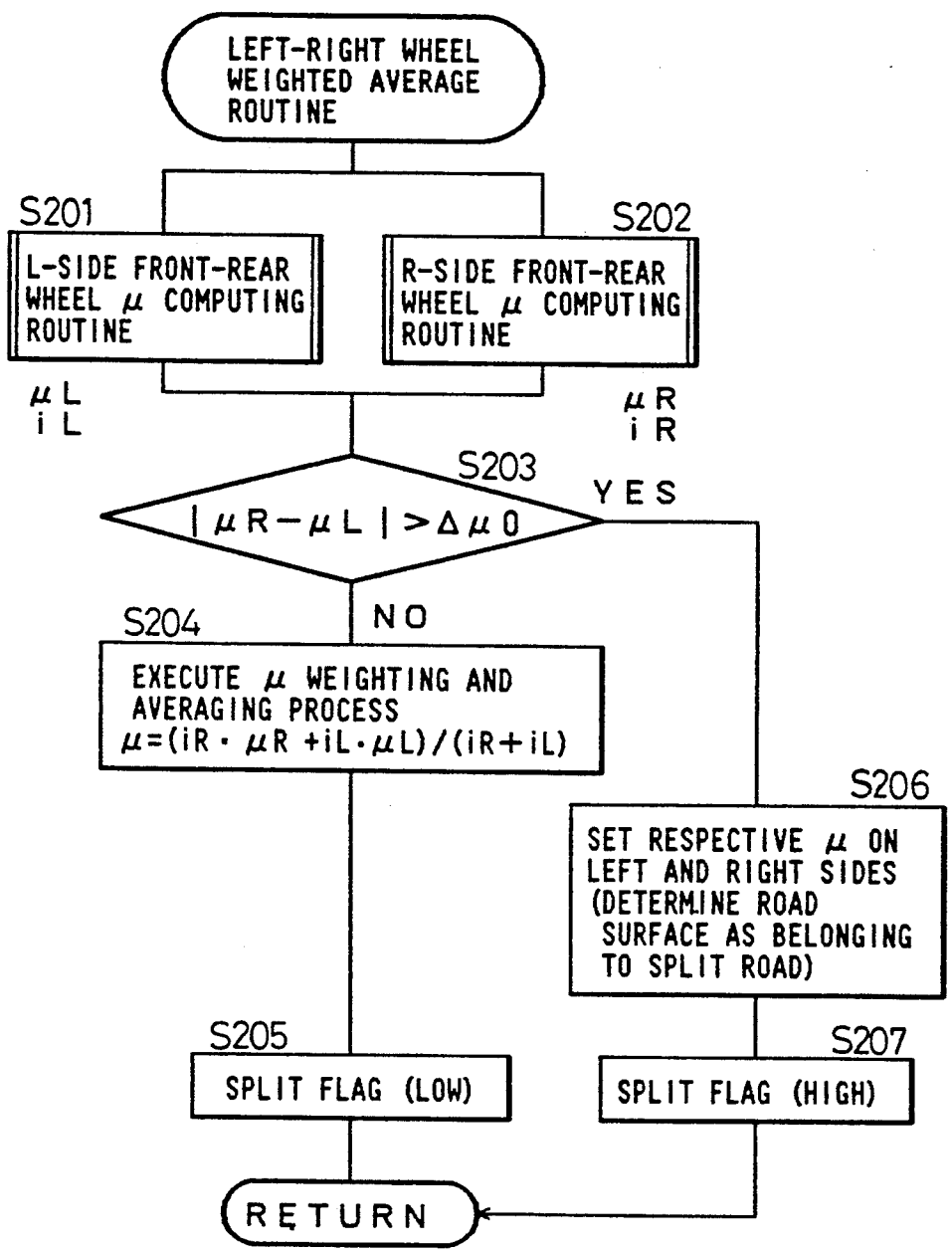
FIG. 14 is a flowchart for describing a left and right wheel weighted average routine.

A description will now be made below of a process for computing μ of a four-wheel vehicle. Referring to FIG. 13, the four-wheel vehicle 190 is provided with front wheels 192R, 192L and rear wheels 194R, 194L. As represented by a flowchart in FIG. 14, μ of the front wheels 192R, 192L and μ of the rear wheels 194R, 194L are respectively averaged in accordance with the μ computing routine shown in FIG. 9. Further, the averaged μ of the front wheels 192R, 192L and the averaged μ of the rear wheels 194R, 194L are weighted and averaged in accordance with a front-rear wheel weighted mean or average routine to thereby compute μR and μL (Steps S201 and S202).

Figure 15:
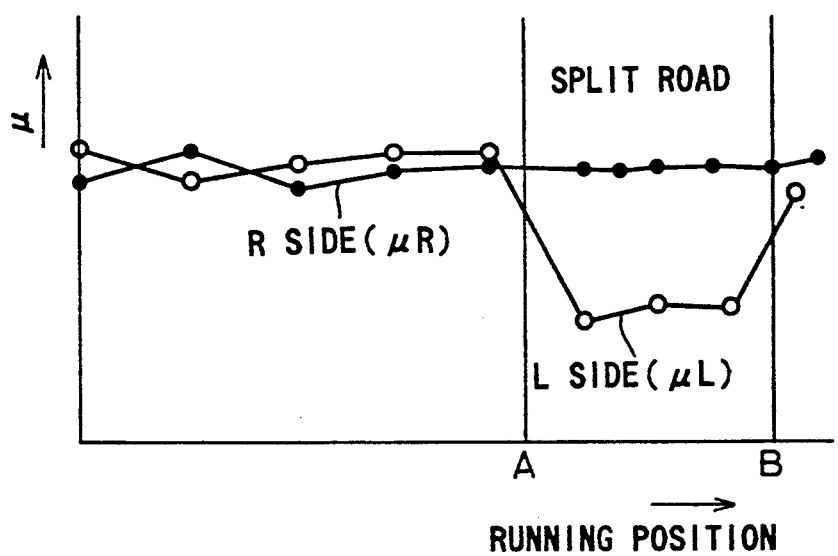
FIG. 15 is a graph for describing relationships between $\mu R$ and $\mu L$ at the time that the state of a road surface has been changed.

It is determined in Step S203 whether or not the μR is approximate to the μL, that is, the left and right road surfaces belong to either the high μ road or the low μ road. If it is determined that the μR is approximate to the μL (i.e., if the answer is determined to be No in Step S203), then the μR and μL are subjected to the weighted average process so as to compute μ of the road surfaces (Steps S204 and S205). If, on the other hand, the μR is greatly different from the μL (i.e., if the answer is determined to be Yes in Step S203), then the states of the left and right road surfaces vary (i.e., it is then determined that the road surface belongs to a slippery road). Therefore, the μR and μL are not weighted and averaged and processes for controlling braking of both the front wheels 192R, 192L and the rear wheels 194R, 194L are independently carried out based on the μR and μL (see Steps S206 and S207 and a split road between A and B in FIG. 15). In the B point in FIG. 15, the μR approximates to the μL again. Therefore, the μR and μL are subjected to the weighted average process. A judgment to be made as to whether or not the weighted means process of the μR and μL should be carried out, can be variously changed by setting the value of Δμ0.

In the method of and the system for controlling the brakes according to the present invention, a braking force for each of the brakes is computed based on the position of an expander position of an antilocking modulator and the torque of a rotative drive source for driving the expander piston. Afterwards, a friction coefficient of a road surface is estimated from the computed braking force. In addition, a target slip ratio and/or a pressure increasing and reducing rate is estimated from the estimated friction coefficient to thereby carry out the optimum braking. Therefore, the optimum target slip ratio and/or pressure increasing and reducing rate can be estimated in association with high and low μ roads, thereby making it possible to provide satisfactory braking. It is also only necessary to detect the position of the expander piston and the torque of the rotative drive source. It is thus unnecessary to use a hydraulic-pressure sensor which is expensive and heavy in weight, thereby making it possible to provide the brake control method which can be efficiently carried out and the brake control system which is extremely economical and light in weight.

In the brake control method according to the present invention, the braking force for each of the brakes at the time that a wheel acceleration/deceleration has reached about zero is measured or computed and the friction coefficient of the road surface is computed based on the computed braking force. Therefore, such a computing process can be carried out with ease and in a short time without taking into consideration the wheel acceleration/deceleration. It is also possible to obtain a more accurate friction coefficient by averaging respective friction coefficients, thereby making it possible to control the brakes with high accuracy. Further, when the slip ratio does not converge to the previous slip ratio, that is, when the state of the road surface abruptly varies, a process for averaging friction coefficients prior to the previous friction coefficient inclusive of the previous friction coefficient is reset or stopped so as to start a process for averaging new friction coefficients including the present friction coefficient. Therefore, the friction coefficient can be computed with high accuracy. It is thus possible to immediately meet any variation in the state of the road surface and carry out the most suitable brake control.

Having now fully described the invention, it will be apparent to those skilled in the art that many changes and modifications can be made without departing from the spirit or scope of the invention as set forth herein.

What is claimed is:

1. A method of controlling brakes, comprising steps of:

detecting the position of an expander piston constituting an antilocking modulator;

detecting the torque of a rotative drive source for driving said expander piston;

computing a braking force for each of said brakes from said detected position of said expander piston and said detected torque of said rotative drive source at said detected position;

estimating friction coefficients of a road surface from said computed braking force; and carrying out the optimum braking by estimating a target slip ratio from said estimated friction coefficients.

2. A method according to claim 1, wherein a crank angle of a crank pin held in engagement with said expander piston is detected as said step of detecting the position of said expander piston, a terminal current value of a d.c. motor is detected as said step of detecting the torque of said d.c. motor serving as said rotative drive source, and caliper pressure is computed as a driving force for each of the brakes from said crank angle and said terminal current value to thereby carry out said step of the optimum braking.

3. A method of controlling brakes, comprising steps of:

detecting the position of an expander piston constituting an antilocking modulator;

detecting the torque of a rotative drive source for driving said expander piston;

computing a braking force for each of said brakes from said detected position of said expander piston and said detected torque of said rotative drive source at said detected position;

estimating friction coefficients of a road surface from said computed braking force; and carrying out the optimum braking by estimating a pressure increasing and reducing rate from said estimated friction coefficients.

4. A method according to claim 3, wherein a crank angle of a crank pin held in engagement with said expander piston is detected as said step of detecting the position of said expander piston, a terminal current value of a d.c. motor is detected as said step of detecting the torque of said d.c. motor serving as said rotative drive source, and caliper pressure is computed as a driving force for each of said brakes from said crank angle and said terminal current value to thereby carry out said step of the optimum braking.

5. A method of controlling brakes, comprising steps of:
   detecting the position of an expander piston constituting an antilocking modulator;
   detecting the torque of a rotative drive source for driving said expander piston;
   computing a braking force for each of said brakes from said detected position of said expander piston and said detected torque of said rotative drive source at said detected position;
   estimating friction coefficients of a road surface from said computed braking force; and
   carrying out the optimum braking by estimating a target slip ratio and a pressure increasing and reducing rate from said estimated friction coefficients.

6. A method according to claim 5, wherein a crank angle of a crank pin held in engagement with said expander piston is detected as said step of detecting the position of said expander piston, a terminal current value of a d.c. motor is detected as said step of detecting the torque of said d.c. motor serving as said rotative drive source, and caliper pressure is computed as a driving force for each of said brakes from said crank angle and said terminal current value to thereby carry out said step of the optimum braking.

7. A method of controlling brakes, comprising steps of:
   determining a braking force for each of said brakes at the time that a wheel acceleration/deceleration has reached about zero;
   computing friction coefficients of a road surface from said determined braking force;
   averaging the present friction coefficient, the previous friction coefficient and friction coefficients prior to said previous friction coefficient when a slip ratio determined at the time that said wheel acceleration/deceleration is substantially zero is converging to the previously-determined slip ratio; and
   stopping a process for averaging said present friction coefficient, said previous friction coefficient and said friction coefficients so as to start a process for averaging new friction coefficients including the present friction coefficient when the slip ratio determined at the time that said acceleration/deceleration is substantially zero is diverging from said previously-determined slip ratio.

8. A method according to claim 7, wherein said step of computing the friction coefficients is executed for every wheel and said step of averaging said computed friction coefficients is executed in accordance with the number of computations of said friction coefficients for every wheel.

9. A method according to claim 7, wherein said step of computing said friction coefficients is executed for every wheel of a four-wheel vehicle, said step of averaging said friction coefficients is executed for every right front and rear wheel and left front and rear wheel, and said friction coefficients of said right front and rear wheels and said friction coefficients of said left front and rear wheels are weighted and averaged when the differences between said former respective friction coefficients and said latter respective friction coefficients fall within a predetermined range.

10. A system for controlling brakes, comprising:
    means for detecting the position of an expander piston constituting an antilocking modulator;
    means for detecting the torque of a rotative drive source for driving said expander piston;
    means for computing a braking force for each of said brakes from said detected position of said expander piston and said detected torque of said rotative drive source at said detected position; and
    means for estimating friction coefficients of a road surface form said computed braking force and estimating a target slip ratio from said estimated friction coefficients.

11. A system for controlling brakes, comprising:
    means for detecting the position of an expander piston constituting an antilocking modulator;
    means for detecting the torque of a rotative drive source for driving said expander piston;
    means for computing a braking force for each of said brakes from said detected position of said expander piston and said detected torque of said rotative drive source at said detected position; and
    means for estimating friction coefficients of a road surface from said computed braking force and estimating a pressure increasing and reducing rate from said estimated friction coefficients.

12. A system for controlling brakes, comprising:
    means for detecting the position of an expander piston constituting an antilocking modulator;
    means for detecting the torque of a rotative drive source for driving said expander piston;
    means for computing a braking force for each of said brakes from said detected position of said expander piston and said detected torque of said rotative drive source at said detected position; and
    means for estimating friction coefficients of a road surface from said computed braking force and estimating a target slip ratio and a pressure increasing and reducing rate from said estimated friction coefficients.

* * * * *